(12) United States Patent
Helou

(10) Patent No.: US 7,059,272 B2
(45) Date of Patent: Jun. 13, 2006

(54) COLLAPSIBLE/EXPANDABLE PET LITTER BOX AND METHOD OF CONSTRUCTING SAME

(76) Inventor: Naoum Helou, 5810 Serrania Ave., Woodland Hills, CA (US) 91367

( * ) Notice: Subject to any disclaimer, the term of this patent is extended or adjusted under 35 U.S.C. 154(b) by 0 days.

(21) Appl. No.: 10/977,259

(22) Filed: Oct. 28, 2004

(65) Prior Publication Data

US 2005/0103277 A1 May 19, 2005

Related U.S. Application Data

(60) Provisional application No. 60/515,385, filed on Oct. 28, 2003.

(51) Int. Cl.
*A01K 29/00* (2006.01)

(52) U.S. Cl. .................................... 119/168

(58) Field of Classification Search ............. 119/168, 119/498, 499; 229/117.02, 122, 125.19
See application file for complete search history.

(56) References Cited

U.S. PATENT DOCUMENTS

| 4,101,052 A | * | 7/1978 | Dove .......................... 229/101 |
| 4,693,411 A | * | 9/1987 | Snyder ................. 229/117.02 |
| 4,792,082 A | * | 12/1988 | Williamson ................. 229/103 |
| 4,940,016 A | * | 7/1990 | Heath .......................... 119/168 |
| 4,986,217 A | * | 1/1991 | Robinson et al. ........... 119/168 |
| 5,014,649 A | * | 5/1991 | Taft ........................... 119/168 |
| 5,178,100 A | * | 1/1993 | Monk .......................... 119/168 |
| 5,476,067 A | * | 12/1995 | Queen et al. ................ 119/168 |
| 5,582,135 A | * | 12/1996 | Bellows ...................... 119/168 |
| 5,758,601 A | * | 6/1998 | Dickson ...................... 119/170 |
| 5,765,504 A | * | 6/1998 | Evans et al. ................. 119/168 |
| 5,913,282 A | * | 6/1999 | Indes et al. .................. 119/168 |

* cited by examiner

*Primary Examiner*—Teri Pham Luu
*Assistant Examiner*—Kimberly S. Smith
(74) *Attorney, Agent, or Firm*—Kelly Lowry & Kelley, LLP

(57) ABSTRACT

A collapsible/expandable pet litter box includes a disposable compact box assembly having a base, a removable lid covering the base, and internally folded flaps connected to the base. The flaps are capable of being unfolded and extended upwardly from the base so as to substantially surround the base and cooperatively form, with the base, a box having sidewalls. One of the sidewalls forms a pet entry and exit aperture. Pet litter is encased within the base of the box. To construct the pet litter box, a first flap is unfolded into an upright position so that a side panel thereof forms a first lateral sidewall. Next, a second flap is unfolded into an upright position so that a side panel thereof forms a second lateral sidewall generally opposite the first lateral sidewall. Then rear panels of the first and second flaps are unfolded towards one another to form a rear sidewall. Front panels of the first and second flaps are unfolded towards one another to form a front sidewall and the pet entry and exit aperture. A barrier is removed to provide access to the pet litter. The sidewalls preferably include tabs which are forced into engagement with slits formed in the lid to securely hold the sidewalls in place.

13 Claims, 3 Drawing Sheets

COLLAPSIBLE/EXPANDABLE PET LITTER BOX AND METHOD OF CONSTRUCTING SAME

RELATED APPLICATION

This application claims the benefit of U.S. Provisional Application No. 60/515,385, filed on Oct. 28, 2003, entitled COLLAPSIBLE/EXPANDABLE PET LITTER BOX AND METHOD OF CONSTRUCTING SAME.

BACKGROUND OF THE INVENTION

The present invention relates to animal litter boxes. More particularly, the present invention relates to a disposable and collapsible/expandable cat litter box.

Many pet owners, and particularly owners of cats, have litter boxes within their homes. These are necessary to prevent the animal from urinating or defecating on the floors and furnishings of the house. The most simple litter box comprises a basin or other receptacle which is partially filled with litter gravel. The gravel is specially designed to capture moisture and coagulate around the animal's excrement.

Other litter boxes use screens or other systems of automatic removal. However, these litter boxes are complicated to assemble and are usually quite expensive.

After a period of use, the gravel in any litter box must be removed and disposed of and new gravel placed within the litter box. This process is unpleasant to the pet owner. This process also necessitates that the owner have a supply, usually a partial bag, of litter gravel on hand to replace the disposed used gravel. Having a partial bag of pet litter gravel on hand takes up storage space and can be quite messy as the opened bags have a tendency to spill.

Even with regular disposal, the litter box can become quite filthy and malodorous. Such litter boxes are unpleasant and unsightly to have in the house. Moreover, such litter boxes can present problems of sanitation for not only the pet, but others within the house as well.

Accordingly, there is a need for a litter box which is self-contained in order to alleviate the need to store partial bags of pet litter. What is also needed is a litter box which is relatively inexpensive. Such a pet litter box should be easy to transport, store and assemble. Further such a pet litter box should be disposable so as to be easily discarded after use. The present invention fulfills these needs and provides other related advantages.

SUMMARY OF THE INVENTION

The present invention resides in a collapsible/expandable pet litter box. The pet litter box is generally comprised of a disposable compact box assembly having a base, a removable lid covering the base, and internally folded flaps connected to the base. The flaps are capable of being unfolded and extended upwardly from the base so as to substantially surround the base and cooperatively form, with the base, a box having sidewalls. One of the sidewalls forms a pet entry and exit aperture. Pet litter is disposed within the base of the box.

The internally folded flaps comprise first and second flaps. The first flap has a side panel that forms a first lateral sidewall of the box when unfolded into an upright position. Similarly, the second flap has a side panel that forms a second lateral sidewall generally opposite the first lateral side wall when unfolded into an upright position. The first and second flaps each have a rear panel that together cooperatively form a rear sidewall when unfolded towards one another. The first and second flaps also each have a front panel that together cooperatively form a front sidewall and the pet entry and exit aperture when folded towards one another.

The pet litter is typically encased within the base with either a removable cover or a plastic bag. The plastic bag preferably includes perforations through a top surface thereof for facilitating access to the pet lifter.

To construct the pet lifter box of the present invention, the first flap is unfolded into an upright position so that a side panel thereof forms a first lateral sidewall. Next, the second flap is unfolded into an upright position so that a side panel thereof forms a second lateral sidewall generally opposite the first lateral sidewall. Then the rear panels of the first and second flaps are unfolded towards one another to form a rear sidewall. The front panels of the first and second flaps are unfolded towards one another to form a front sidewall and the pet entry and exit aperture.

A barrier is removed to provide access to the encased pet lifter. In a first embodiment of the invention, a removable cover positioned over the pet lifter is removed to provide access to the cat lifter. In another embodiment, a plastic bag is opened, preferably by tearing away a perforated top surface from the plastic bag.

The lid can be placed on top of the sidewalls to securely hold them in place. The sidewalls preferably include tabs which are forced into engagement with slits formed in the lid.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
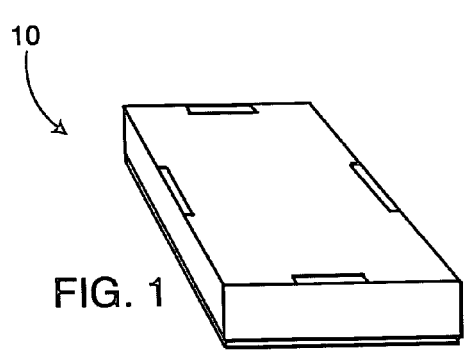
FIG. 1 is a perspective view of a collapsed compact box assembly embodying the present invention.

As shown in the drawings for purposes of illustration, the present invention is concerned with a collapsible/expandable pet litter box assembly 10. The pet litter box assembly 10 is self-contained and preferably constructed of cardboard or similar disposable yet fairly durable and inexpensive material.

Figure 2:
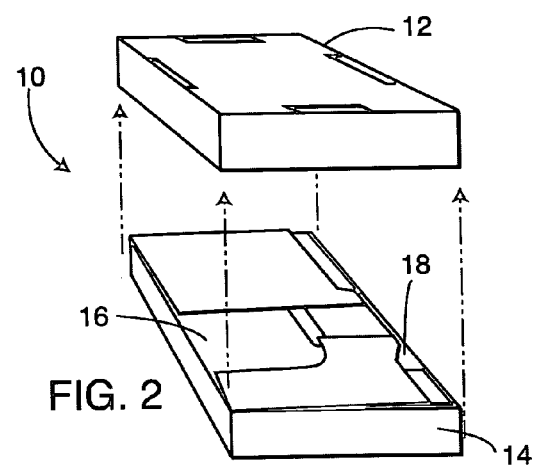
FIG. 2 is an exploded perspective view of the box assembly of FIG. 1, illustrating the removal of a lid from the box assembly.

The pet litter box assembly 10 is manufactured and sold in a compact and collapsed state, as illustrated in FIG. 1. The compactness of the assembly 10 when fully collapsed provides easy transportation of the assembly 10 by both sellers and purchasers. The assembly 10 includes a removable lid 12 that covers a base 14 of the assembly, as illustrated in FIG. 2. Within the base are two folded flaps 16 and 18.

Figure 3:
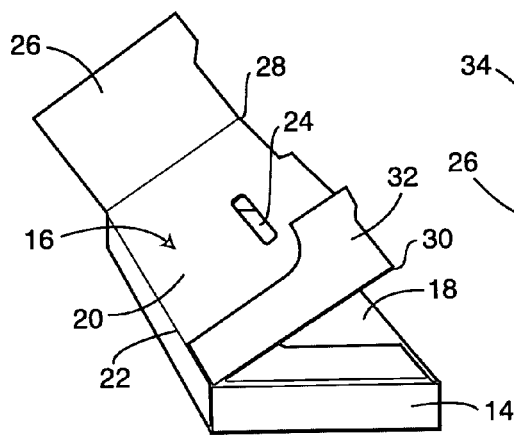
FIG. 3 is a perspective view of the box assembly of FIGS. 1 and 2, illustrating the unfolding and upward extension of a flap within the box assembly.
Figure 4:
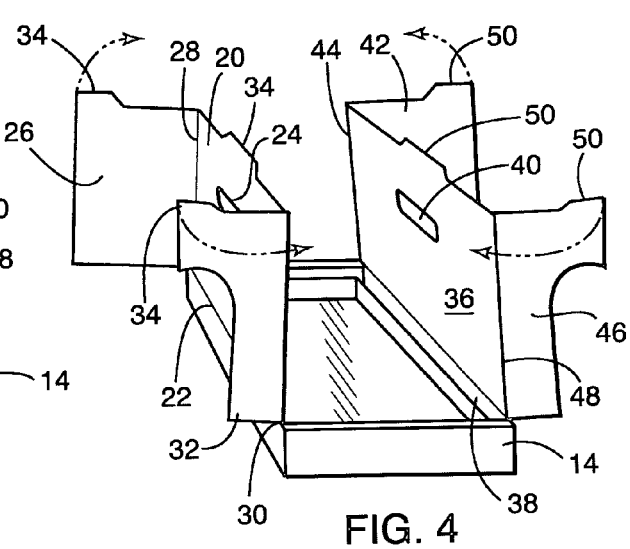
FIG. 4 is a perspective view of the box assembly of FIGS. 1–3, illustrating first and second flaps fully extended uprightly and partially unfolded.

With reference to FIGS. 3 and 4, the first flap 16 includes a side panel 20 having an edge 22 thereof formed with or otherwise connected to the base 14. The side panel 20 is typically rectangular in shape. The side panel 20 preferably has a handle aperture 24 formed therethrough. The first flap 16 also includes a rear panel 26 hingedly formed with or otherwise attached to a rear edge 28 of the side panel 20. The rear panel is typically square or rectangular in shape. At a front edge 30 of the first side panel 20 a front panel 32 is hingedly formed with or otherwise similarly attached to the front edge 30. The front panel 32 would be square or rectangular in shape but for an inverted J-shaped cut-out portion opposite the front edge 30. Each of the side panel 20, rear panel 26 and front panel 32 have a tab 34 extending from a top surface thereof.

The second flap 18 includes a side panel 36 having an edge 38 thereof formed with or otherwise connected to the base 14. The side panel 36 is typically rectangular in shape. The side panel 36 preferably has a handle aperture 40 formed therethrough. The second flap 18 also includes a rear panel 42 hingedly formed or otherwise attached to a rear edge 44 of the side panel 36. The rear panel 42 is typically square or rectangular in shape. A front panel 46 is hingedly formed with or otherwise similarly attached to a front edge 48 of the second side panel 36. The front panel 46 would be square or rectangular in shape but for an inverted J-shaped cut out portion opposite the front edge 48 interconnecting the side panel 36 and front panel 46. Each of the side panel 36, rear panel 42 and front panel 46 have a tab 50 extending from a top surface thereof.

To construct the assembly 10 into a pet litter box 52, the lid 12 is first removed from the base 14 of the assembly 10, as illustrated in FIG. 2. Next, as illustrated in FIG. 3, the first flap 16 is extended upwardly so that the first side panel 20 extends generally perpendicular to the major plane of the base 14 to form a first lateral sidewall 54. Similarly, the second flap 18 is extended upwardly so that the second side panel 36 extends generally perpendicular to the major plane of the base 14 to form a second lateral sidewall 56 generally opposite the first lateral sidewall 54, as illustrated in FIG. 4.

Figure 5:
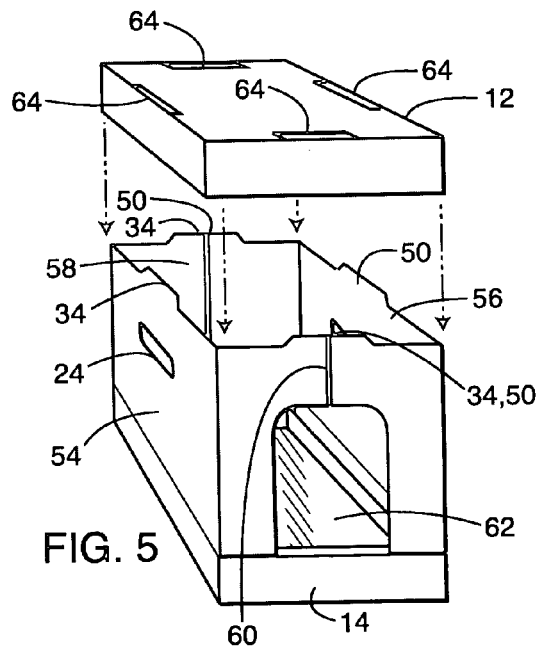
FIG. 5 is an exploded perspective view of the flaps of FIGS. 3 and 4 fully extended and unfolded to form a box having a pet entry and exit and the placement of the lid of FIGS. 1 and 2 on the box.

The rear panels 26 and 42 are then unfolded and brought towards one another to form a rear sidewall 58. Similarly, the front panels 32 and 46 are unfolded towards one another to form a front sidewall 60. The J-shaped cut-outs from each of the front panels 32 and 46 cooperatively form a pet entry and exit aperture 62 in the front sidewall 60. As illustrated in FIG. 5, when the first and second flaps 16 and 18 are fully extended and unfolded, the resulting sidewalls 54–60 form a box surrounding the base 14.

Figure 6:
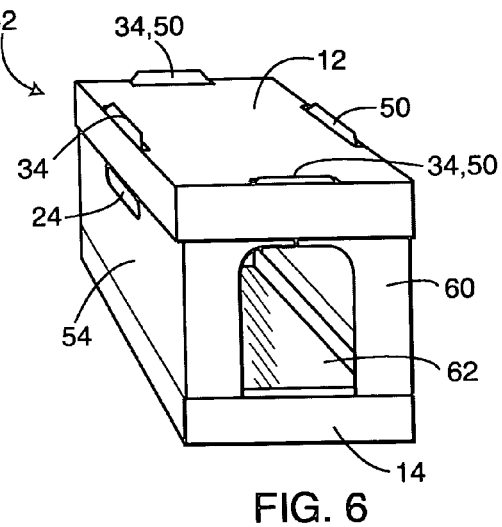
FIG. 6 is a perspective view of a collapsible/expandable pet litter box embodying the present invention in a fully expanded and constructed state.

The lid 12 is placed over the top surfaces of the sidewalls 54–60 to hold the sidewalls 54–60 in place and complete the pet litter box 52, which has the appearance of a small house-like structure. Preferably, the lid 12 includes slits 64 formed therethrough and positioned along an outer circumference such that when the lid 12 is placed over the sidewalls 54–60 the tabs 34 and 50 can be forcibly inserted into the slits 64 so as to securely hold the various above-described components of the pet litter box 52 in place so as to retain the shape of the house-like structure, as illustrated in FIG. 6. The handle apertures 24 and 40 can be grasped to move the pet litter box 52 as the need arises.

Figure 7:
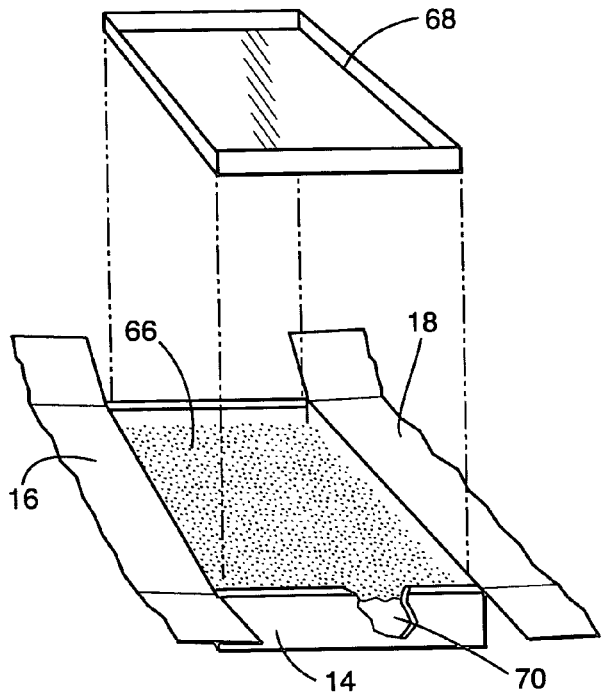
FIG. 7 is a partially fragmented and exploded perspective view of the base of the assembly and a cover removed therefrom to provide access to pet litter disposed within the base.
Figure 9:
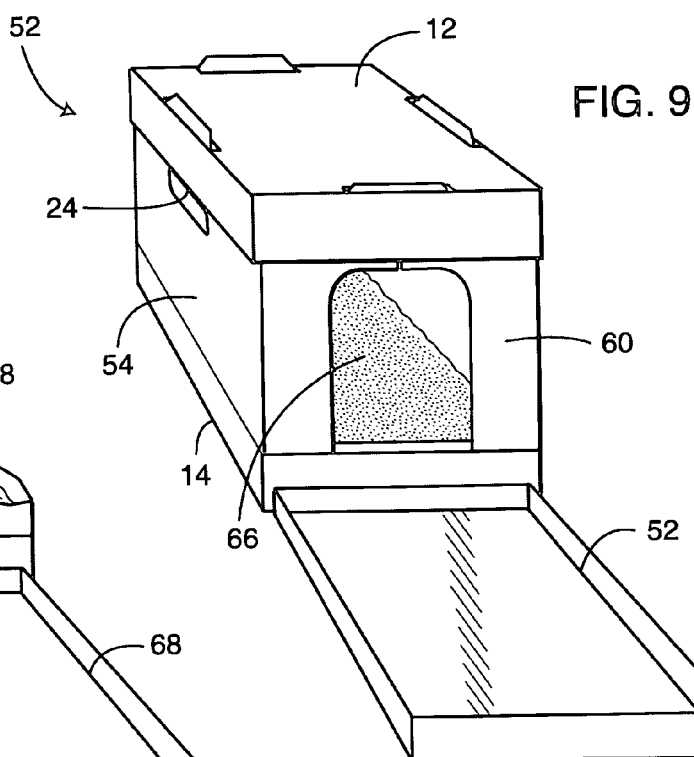
FIG. 9 is a perspective view of a fully constructed pet litter box of FIG. 8.
Figure 8:
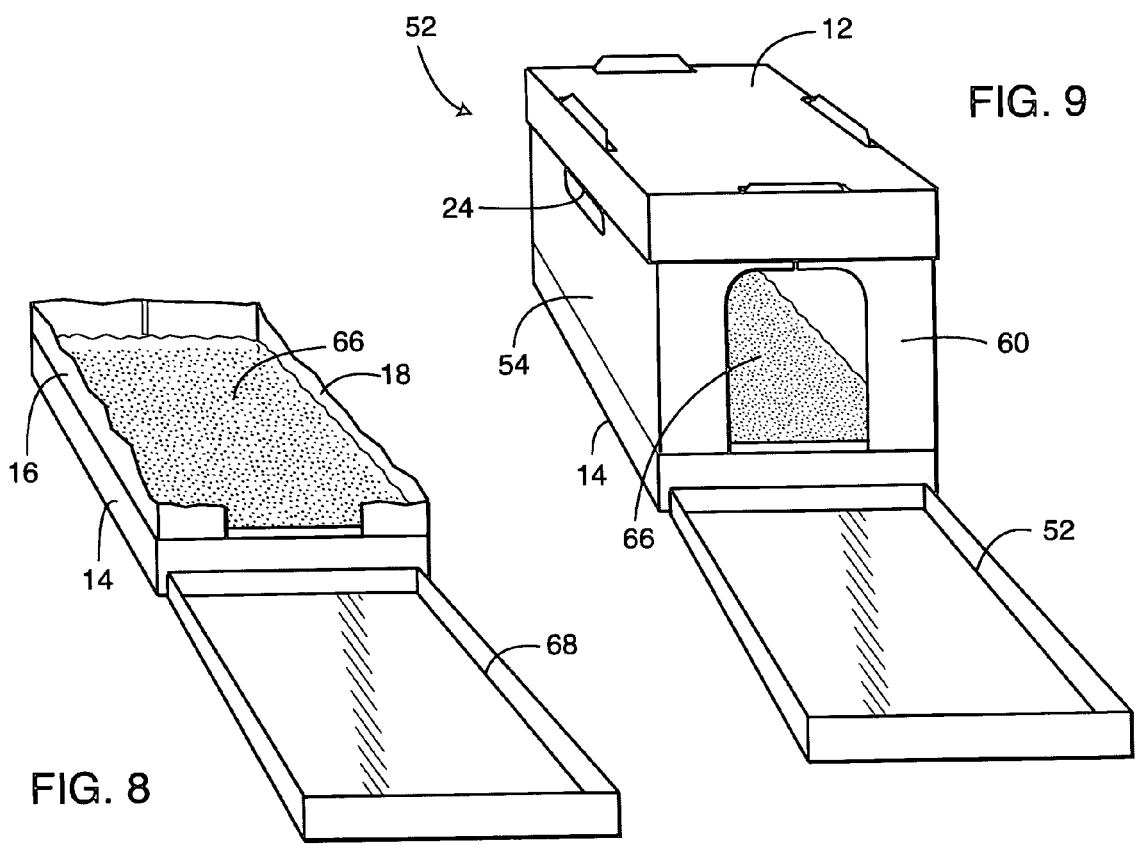
FIG. 8 is a partially fragmented perspective view similar to FIG. 7, illustrating the placement of the cover in front of the box assembly for use as a mat in front of the pet entry and exit.

Referring now to FIGS. 7–9, pet litter 66 is typically disposed within the base 14 of the assembly 10 during manufacture. In one form of the invention, the pet litter 66 is held in place within the base 14 by a removable cover 68 which encases the pet litter 66 within the base so as to prevent the pet litter 66 from spilling from the assembly 10 as it is transported or stored. After the lid 12 has been removed from the assembly 10 and the first and second flaps 16 and 18 at least partially unfolded so as to removed from the base 14 during construction of the pet litter box 52, the cover 68 is removed from its tight fit with the sides of the base 14 so as to open access to the pet litter 66, as illustrated in FIG. 7. The construction of the pet litter box 52 is then completed as described above. Preferably, a plastic liner 70, or similar liner, underlies the pet litter 66 and covers the bottom of the base 14 to prevent the seepage of urine or other liquid through the cardboard base 14. The cover 68 may be placed in front of the open/exit aperture 62 of the fully constructed pet litter box 52 to act as a mat which can capture pet litter 66 that may fall out of the pet litter box 52 during use, as illustrated in FIGS. 8 and 9.

Figure 10:
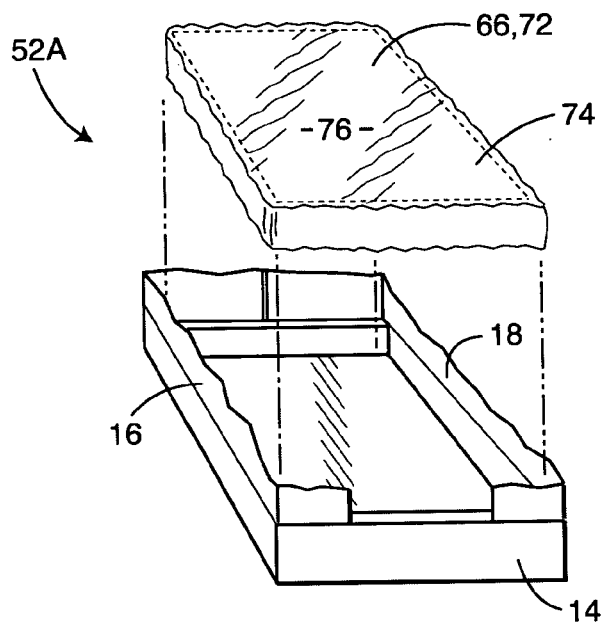
FIG. 10 is a partially fragmented and exploded perspective view of another pet litter box embodying the present invention, illustrating a plastic bag containing the pet litter and its placement within the base.
Figure 11:
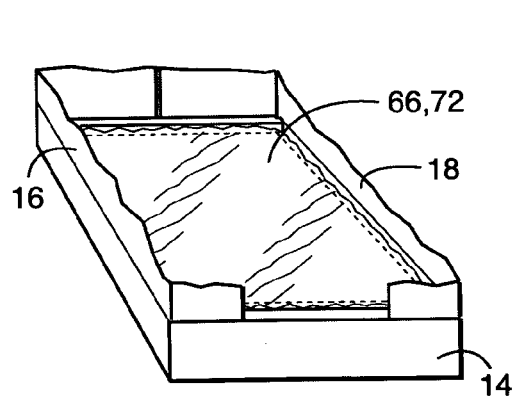
FIG. 11 is a partially fragmented perspective view of the plastic bag of FIG. 10 disposed within the base.
Figure 12:
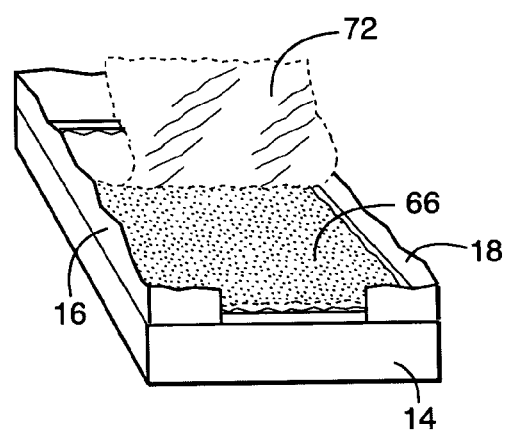
FIG. 12 is a partially fragmented perspective view of the pet litter box of FIGS. 10 and 11, illustrating the removal of a top surface of the plastic bag to provide access to the pet litter.

Referring to FIGS. 10–12, in an alternative embodiment, the pet litter 66 is encased within a plastic bag 72 or the like which conforms to the base 14 so as to be disposed therein. Typically, the plastic bag 72 filled with pet litter 66 has been previously disposed within the base 14 so that the compact assembly 10 is sold with the pet litter 66 securely encased therein. The plastic bag 72 preferably includes perforations 74 substantially surrounding a top surface 76 thereof so as to facilitate access to the pet litter 66. In use, during the expansion and construction of the pet litter box 52A, once the first and second flaps 16 and 18 are removed from the base 14, the top surface 76 of the plastic bag 72 is grasped by the user and torn away at the perforations 74 to provide access to the pet litter 66, as illustrated in FIG. 12. The construction of the pet litter box 52A is then completed as described above.

A typical pet litter box 52 or 52A is intended to be used by a one pet household for approximately two weeks. After such use, the pet litter box 52 or 52A is light enough that it may be picked up, for example by the handle apertures 24 and 40, and thrown away. A new assembly 10 is then constructed for use.

From the foregoing, it is seen that the assembly 10 can be manufactured relatively inexpensively due to the disposable materials used. The expansion and construction of the pet litter box 52 or 52A is relatively straightforward and simple. As the materials used to construct the box 52 or 52A comprise lightweight materials such as cardboard and plastic, there is little inconvenience in disposing of the used litter box 52 or 52A. Also, due to the small dimensions of the compact and collapsed assembly 10, several can be purchased and stored in a pet owner's house or garage for future use. As the assemblies 10 are self-contained and the pet litter 66 completely encased within the base 14, there is little fear of pet litter 66 spilling from the assembly during storage. As the pet litter boxes 52 or 52A are used for such a short period of time, the accompanying messiness and odor prevalent in other litter boxes is avoided.

Although several embodiments have been described in detail for purposes of illustration, various modifications may be made without departing from the scope and spirit of the invention. Accordingly, the invention is not to be limited, except as by the appended claims.

What is claimed is:

1. A collapsible/expandable pet litter box, comprising:
    a disposable compact box assembly that includes a base, a removable lid covering the base, and internally folded flaps connected to the base and capable of being unfolded and extended upwardly from the base so as to substantially surround the base and cooperatively form, with the base, a box having sidewalls, one of the sidewalls including an aperture for pet entry and exit, wherein the internally folded flaps comprise first and second flaps, the first flap having a side panel that forms a first lateral sidewall of the box when unfolded into an upright position, the second flap having a side panel that forms a second lateral sidewall generally opposite the first lateral side wall when unfolded into an upright position, the first and second flaps each having a rear panel that cooperatively form a rear sidewall when unfolded towards one another, and the first and second flaps each having a front panel that cooperatively form a front sidewall and the pet entry and exit aperture when folded towards one another, each of the front panels defining a portion of the pet entry and exit aperture; and
    pet litter encased within the base.

2. The litter box of claim 1, wherein the lid of the compact box assembly includes slits which are engageable with tabs of the flaps to secure the flaps in place as sidewalls when unfolded.

3. The litter box of claim 1, wherein a removable cover encases the pet litter within the base.

4. The litter box of claim 3, wherein the cover comprises a mat positioned exterior and adjacent to the pet entry and exit aperture.

5. The litter box of claim 1, wherein a plastic bag containing the pet litter includes perforations through a top surface thereof for facilitating access to the pet litter.

6. The litter box of claim 1, including a plastic liner disposed between the base and the pet litter.

7. A method of constructing a pet litter box, comprising the steps of:
    providing a collapsible/expandable box assembly having a base, pet litter disposed within the base, and internally folded flaps connected to the base;
    unfolding a first flap into an upright position so that a side panel thereof forms a first lateral sidewall;
    unfolding a second flap into an upright position so that a side panel thereof forms a second lateral sidewall generally opposite the first lateral sidewall;
    unfolding rear panels of the first and second flaps towards one another to form a rear sidewall; and
    unfolding front panels of the first and second flaps towards one another to form a front sidewall and a pet entry and exit aperture; and
    removing a barrier to the pet litter to provide access thereto.

8. The method of claim 7, including the step of forcing tabs extending from the sidewalls into engagement with slits formed in a lid.

9. The method of claim 7, wherein the removing step includes removing a cover positioned over the pet litter.

10. The method of claim 9, wherein the cover removing step includes the step of positioning the removed cover adjacent to the pet entry and exit aperture to act as a mat.

11. The method of claim 7, wherein the removing step includes the step of opening a plastic bag encasing the pet litter.

12. The method of claim 11, including the step of tearing away a perforated top surface from the plastic bag.

13. The method of claim 7, including the step of disposing a plastic liner between the base and the pet litter.

* * * * *